US012460146B2

(12) United States Patent
Ly et al.

(10) Patent No.: US 12,460,146 B2
(45) Date of Patent: Nov. 4, 2025

(54) METHODS OF GENERATING A LUBRICATION INTERFACE, METHODS OF ENHANCHING LUBRICATION OF MOVING PARTS AND LUBRICANTS

(71) Applicant: City University of Hong Kong, Hong Kong (HK)

(72) Inventors: Thuc Hue Ly, Hong Kong (HK); Quoc Huy Thi, Hong Kong (HK)

(73) Assignee: City Univerty of Hong Kong, Hong Kong (HK)

( * ) Notice: Subject to any disclaimer, the term of this patent is extended or adjusted under 35 U.S.C. 154(b) by 300 days.

(21) Appl. No.: 18/317,962

(22) Filed: May 16, 2023

(65) Prior Publication Data

US 2024/0384194 A1 Nov. 21, 2024

(51) Int. Cl.
*C10M 103/06* (2006.01)
*C10M 173/02* (2006.01)
(Continued)

(52) U.S. Cl.
CPC ........ *C10M 103/06* (2013.01); *C10M 173/02* (2013.01); *C10M 177/00* (2013.01);
(Continued)

(58) Field of Classification Search
CPC .... B05D 5/00; B05D 5/10; H01J 37/20; H01J 37/26; C23C 16/01; C23C 16/26; C23C 16/305; C23C 16/342; C01P 2004/02; C01P 2004/04; C01G 39/06; C10N 2070/00; C10N 2030/06; B82Y 30/00; B82Y 40/00; C10M 177/00; C10M 173/02;
(Continued)

(56) References Cited

U.S. PATENT DOCUMENTS

| 4,088,585 A | 5/1978 | Karpen |
| 2015/0274519 A1* | 10/2015 | Wei ........................ B82Y 40/00 |
| | | 156/80 |

OTHER PUBLICATIONS

Lee, et al., Frictional Characteristics of Atomically Thin Sheets, Science, vol. 328, Apr. 2, 2010.
(Continued)

*Primary Examiner* — Vishal V Vasisth
(74) *Attorney, Agent, or Firm* — Heslin Rothenberg Farley & Mesiti P.C.; Melvin Li

(57) ABSTRACT

The present invention is concerned with a method of generating a lubrication interface. The method has the steps of a) providing a target substrate and a growth substrate adjacent the target substrate with a confinement space defined therebetween, b) allowing a predetermined amount of water onto a surface of the target substrate in the confinement space thus forming a water layer, c) adding a predetermined amount of a sample of a molybdenum disulfides ($MoS_2$) layer on the water layer thus allowing the water in the water layer to bind with the surface of the molybdenum disulfides ($MoS_2$) layer, d) cooling down the target substrate to cryogenic temperature so as to freeze the water layer thus forming a molybdenum disulfides ($MoS_2$) ice layer on the target substrate, and e) detaching the growth substrate from the molybdenum disulfides ($MoS_2$) ice layer thus leaving the molybdenum disulfides ($MoS_2$) ice layer.

17 Claims, 15 Drawing Sheets
(15 of 15 Drawing Sheet(s) Filed in Color)

(51) Int. Cl.
    *C10M 177/00*    (2006.01)
    *B82Y 30/00*     (2011.01)
    *B82Y 40/00*     (2011.01)
    *C10N 70/00*     (2006.01)
(52) U.S. Cl.
    CPC ............... *B82Y 30/00* (2013.01); *B82Y 40/00* (2013.01); *C10M 2201/02* (2013.01); *C10M 2201/0663* (2013.01); *C10N 2070/00* (2013.01)
(58) Field of Classification Search
    CPC ........ C10M 103/06; C10M 2201/0663; C10M 2201/02; C10M 2201/066
    See application file for complete search history.

(56) References Cited

OTHER PUBLICATIONS

Spear, et al., 2D-nanomaterials for controlling friction and wear at interfaces, Science Direct, May 26, 2015.
Chhowalla, et al., Thin ®lms of fullerene-like MoS2 nanoparticles with ultra-low friction and wear, Macmillan Magazines Ltd., Nature, vol. 407 Sep. 14, 2000.
Rosenkranz, et al., Perspectives of 2D MXene Tribology, Advanced Science News, Perspective, 2022.
Wyatt, et al., 2D MXenes: Tunable Mechanical and Tribological Properties, Advanced Materials, Perspective, 2021.
Dienwiebel, et al., Superlubricity of Graphite, Physical Review Letters, vol. 92, No. 12 Mar. 26, 2004.
Deng, et al., Adhesion-dependent negative friction coefficient on chemically modified graphite at the nanoscale, Nature Materials, Oct. 14, 2012.
Wang, et al., Superlubricity between MoS2 Monolayers, Advanced Materials, 2017.
Tonge, et al., Tribological Evaluation of Lead-Free MoS2-Based Solid Film Lubricants as Environmentally Friendly Replacements for Aerospace Applications, , MDPI, Lubricants 2022.
Liu, et al., Recent advances in friction and lubrication of graphene and other 2D materials: Mechanisms and applications, Friction 7(3): 199-216 2019.
Berman, et al., Achieving Ultralow Friction and Wear by Tribocatalysis Enabled by In-Operando Formation of Nanocarbon Films, ACS Publications, Nano, American Chemical Society, 2021.
Li, et al., Mapping the elastic properties of two-dimensional MoS2 via bimodal atomic force microscopy and finite element simulation, Nature Partner Journals, Computational Materials, Aug. 29, 2018.
Pham, et al., Thermal and mechanical characterization of nanoporous two dimensional MoS2 membranes, Scientific Reports, vol. 12 2022.
Yan, et al., Highly stretchable van der Waals thin films for adaptable and breathable electronic membranes, Science, Research Article, vol. 375, pp. 852-859 Feb. 25, 2022.
Zhao, et al., Transition from Thermal to Athermal Friction under Cryogenic Conditions, The American Physical Society, Physical Review Letters, 2009.
Hasz, et al., Bifurcation of nanoscale thermolubric friction behavior for sliding on MoS2, Physical Review Materials, vol. 5 2021.
Lavini, et al., Friction and work function oscillatory behavior for an even and odd No. of layers in polycrystalline MoS2†, Royal Society of Chemistry, Nanoscale Paper, vol. 10, pp. 8304-8310 2018.
Zhao, et al., The Role of Water in Modifying Friction within MoS2 Sliding Interfaces, Applied Materials and Interfaces, vol. 2, No. 5, pp. 1444-1448 2010.
Levita, et al., Effects of Water Intercalation and Tribochemistry on MoS2 Lubricity: An Ab Initio Molecular Dynamics Investigation, ChemPhysChem, vol. 18., pp. 1475-1480 2017.
Tang, et al., Nanoscopic humidity-dependent adhesion behaviors of 2D materials, Applied Surface Science,https://doi.org/10.1016/j.apsusc.2021.151394, Sep. 25, 2021.
Arif, et al., Effect of Humidity and Water Intercalation on the Tribological Behavior of Graphene and Graphene Oxide, American Chemical Society, ACS Publications, Applied Materials & Interfaces, vol. 10, pp. 22537-22544 2018.
Chen, et al., Effect of Humidity on Friction and Wear—A Critical Review, MDPI, Lubricants, http://dx.doi.org/10.3390/lubricants6030074, vol. 6 2018.
Marian, et al., Layered 2D Nanomaterials to Tailor Friction and Wear in Machine Elements—A Review, Advanced Materials Interfaces, vol. 9 2022.
Babuska, et al., Temperature-Dependent Friction and Wear Behavior of PTFE and MoS2, Crossmark, Original Paper, DOI 10.1007/s11249-016-0702-y, 2016.
Onodera, et al., A Computational Chemistry Study on Friction of h-MoS2. Part II. Friction Anisotropy, J. Phys. Chem., vol. 114, 15832-15838 2010.
Han, et al., Phase transitions in confined water nanofilms, Nature Physics, http://www.nature.com/doifinder/10.1038/nphys1708, Jul. 4, 2010.
Zangi, et al., Monolayer Ice, The American Physical Society, Physical Review Letters, vol. 91, No. 2, Jul. 11, 2003.
Zangi, et al., Bilayer ice and alternate liquid phases of confined water, J. Chem. Phys. 119, 1694, https://doi.org/10.1063/1.1580101 2003.
Kwac, et al., Multilayer Two-Dimensional Water Structure Confined in MoS2, The Journal of Physical Chemistry, pubs. acs.org/JPCC, American Chemical Society, DOI: 10.1021/acs.jpcc.7b05153, vol. 121, pp. 16021-16028 2017.
Lee, et al., Nanoscale Friction on Confined Water Layers Intercalated between MoS2 Flakes and Silica, The Journal of Physical Chemistry, American Chemical Society, http://dx.doi.org/10.1021/acs.jpcc.8b11426 , J. Phys. Chem., vol. 123, pp. 8827-8835 2019.
Zhu, et al., Superheating of monolayer ice in graphene nanocapillaries, The Journal of Chemical Physics, vol. 146, p. 134703 2017.
P. Bampoulis, Temperature induced dynamics of water confined between graphene and MoS2, The Journal of Chemical Physics, J. Chem. Phys. 154, 134705, https://doi.org/10.1063/5.0044123 2021.
Bampoulis, et al., Hydrophobic Ice Confined between Graphene and MoS2, The Journal of Physical Chemistry, American Chemical Society, ACS Publications, DOI: 10.1021/acs.jpcc.6b09812 J. Phys. Chem. Vol. 120, p. 27079-27084 2016.
Cunningham, et al., Solvent Exfoliation of Transition Metal Dichalcogenides: Dispersibility of Exfoliated Nanosheets Varies Only Weakly between Compounds, ACS Nano, vol. 6, No. 4, pp. 3468-3480 2012.
He, et al., Synthesis of N-doped carbon quantum dots as lubricant additive to enhance the tribological behavior of MoS2 nanofluid, Springer, Research Article, https://doi.org/10.1007/s40544-022-0619-4, Friction vol. 11(3): pp. 441-459 2023.
Hirunpinyopas, et al., Desalination and Nanofiltration through Functionalized Laminar MoS2 Membranes, ACS Nano, American Chemical Society, http://dx.doi.org/10.1021/acsnano.7b05124, vol. 11, pp. 11082-11090 2017.
Zhang, et al., Adhesion and friction control localized folding in supported graphene, Journal of Applied Physics vol. 113, pp. 193501 2013.
Quereda, et al., Single-layer MoS2 roughness and sliding friction quenching by interaction with atomically flat substrates, Applied Physics Letters, vol. 105, pp. 053111 2014.
Deng, et al., A study of static friction between silicon and silicon compounds, J. Micromech. Microeng. vol. 2, p. 14 1992.
Koga, et al., Formation of ordered ice nanotubes inside carbon nanotubes, Macmillan Magazines Ltd., Nature, vol. 412, Aug. 23, 2001.
Deng, et al., Adhesion Energy of MoS2 Thin Films on Silicon-Based Substrates Determined via the Attributes of a Single MoS2 Wrinkle, American Chemical Society, ACS Publications, http://dx.doi.org/10.1021/acsami.6b16175, ACS Appl. Mater. Interfaces, vol. 9, pp. 7812-7818 2017.

(56) References Cited

OTHER PUBLICATIONS

Zangi, et al., Bilayer ice and alternate liquid phases of confined water, J. Chem. Phys., vol. 119, p. 1694 https://doi.org/10.1063/1.1580101 2003.

* cited by examiner

Fig. 2c

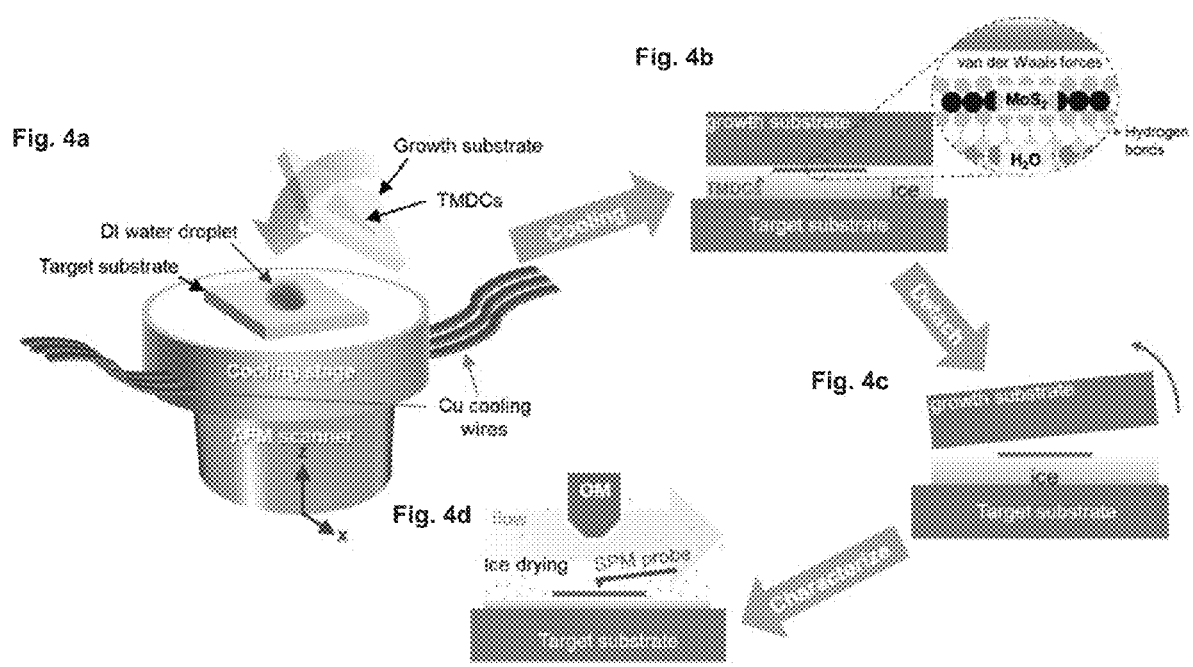

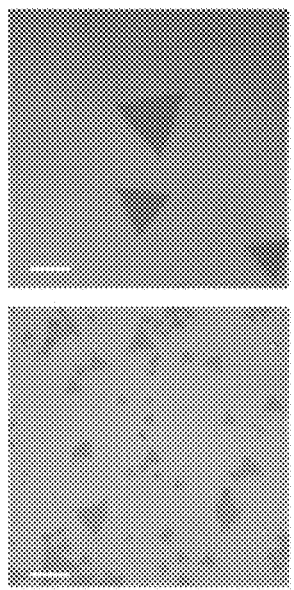
Fig. 5a
Fig. 5c
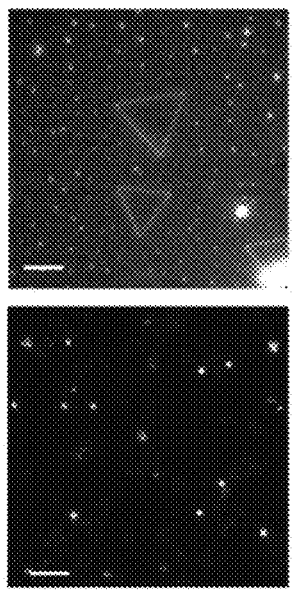
Fig. 5b
Fig. 5d
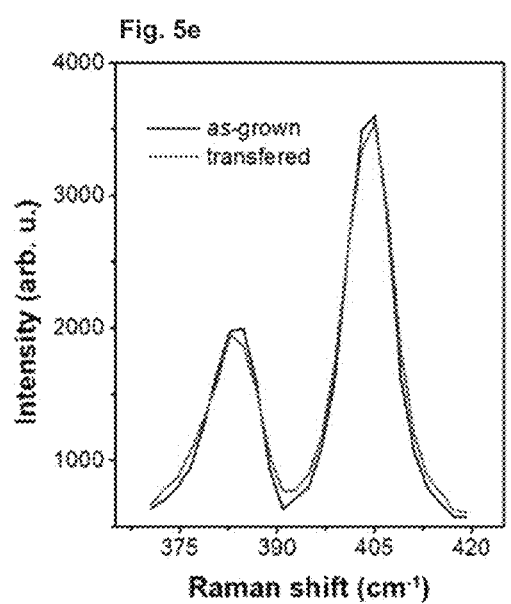
Fig. 5e

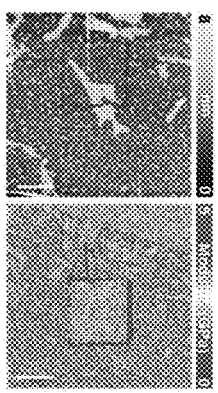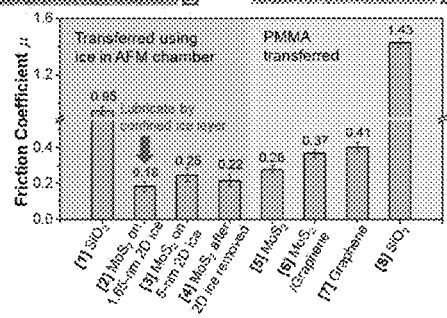

Before
Fig. 15a
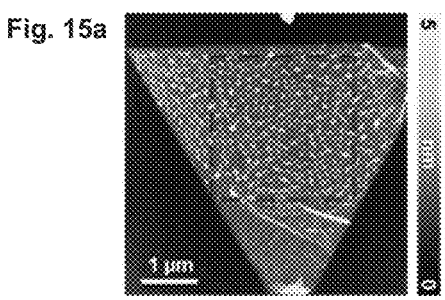
After
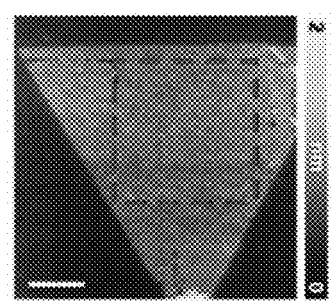
Fig. 15b
Fig. 15c
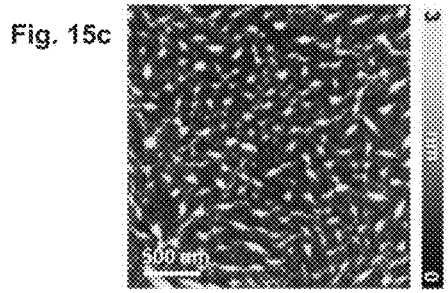
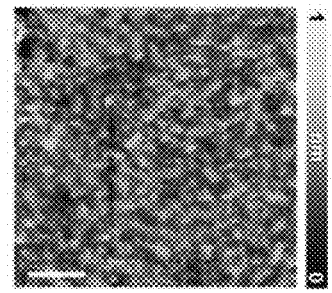
Fig. 15d

METHODS OF GENERATING A LUBRICATION INTERFACE, METHODS OF ENHANCHING LUBRICATION OF MOVING PARTS AND LUBRICANTS

FIELD OF THE INVENTION

The present invention is concerned with a method of generating a lubrication interface, a method of enhancing lubrication of moving parts, a lubricant, an additive for lubricants, and a method of enhancing lubrication performance of lubricants in a low temperature and high humidity environment.

BACKGROUND OF THE INVENTION

The following discussion of the background art is intended to facilitate an understanding of the present invention only. It should be appreciated that the discussion is not an acknowledgement or admission that any of the material referred to was part of the common general knowledge as at the priority date of the application.

Layered van der Waals (vdW) surfaces offer superior lubricity properties such as graphite and molybdenum disulphide ($MoS_2$) and are being widely used in different fields from aerospace to machinery industries. Their excellent lubricating and anti-wear performance is attributed to the low shear resistance between the adjacent atomic layers and the strong in-plane elastic modulus. However, these solid-state lubricants normally have markedly increased friction with decreased temperature in the range of $-73°$ C. to $27°$ C., suggesting the enormous challenges in maintaining the performances of the solid lubricants at low temperatures. In addition, humid environment also results in a surge of friction in $MoS_2$ and other solid lubricants. As a result, the vdW solid lubricants, and two-dimensional (2D) electromechanical devices with movable, or twistable vdW interfaces have been facing major problems under low temperature high humidity conditions.

The present invention seeks to address at least the aforementioned problems, or at least to provide alternatives to the public.

SUMMARY OF THE INVENTION

According to a first aspect of the present invention, there is provided a method of generating a lubrication interface, comprising the steps of a) providing a target substrate and a growth substrate adjacent the target substrate, the target substrate and the growth substrate together defining a confinement space therebetween, b) allowing a predetermined amount of water onto a surface of the target substrate in the confinement space thus forming a water layer, c) adding a predetermined amount of a sample of a molybdenum disulfides ($MoS_2$) layer on the water layer thus allowing the water in the water layer to bind with the surface of the molybdenum disulfides ($MoS_2$) layer, d) cooling down the target substrate to cryogenic temperature so as to freeze the water layer thus forming a molybdenum disulfides ($MoS_2$) ice layer on the target substrate, and e) detaching the growth substrate from the molybdenum disulfides ($MoS_2$) ice layer thus leaving the molybdenum disulfides ($MoS_2$) ice layer, wherein the molybdenum disulfides ($MoS_2$) ice layer acts as the lubrication interface. In a laboratory environment, the water may be ultrapure water used on a rigid surface. Also, in a laboratory environment, the step of allowing a predetermined amount of water onto a surface refers to applying the water on the surface. However, in the context lubricating, for example, between wheel surface and ground surface in sub-zero conditions, the water referred to can be the surrounding environment water.

Preferably, in the step of applying the sample of the molybdenum disulfides ($MoS_2$), the sample may be placed face up-side-down on the water layer. This means that the surface of growth substrate containing $MoS_2$ is facing to the water layer on target substrate. When it is attached, the layer from top to bottom is growth substrate-$MoS_2$-water layer-target substrate. This is an optional but advantageous set-up for AFM measurement because the target substrate with water droplet on it was fixed on the AFM stage.

Suitably, in the step of cooling down the target substrate to cryogenic temperature, the ice layer formed may be confined between vdW surface of the molybdenum disulfides ($MoS_2$) layer and the surface of the target substrate.

Advantageously, the method, after the step of detaching the growth substrate, may include a step of subliming surrounding area of the ice layer not covered by the molybdenum disulfides ($MoS_2$) layer and thinning the ice layer to a two-dimensional (2D) ice layer structure. The molybdenum disulfides ($MoS_2$) layer may be an atomic-thick layered structure.

In an embodiment, the area of the lubrication interface generated may be defined by the area of the molybdenum disulfides ($MoS_2$) applied on the water layer.

In one embodiment, the area of the lubrication interface generated may depend on the size of the molybdenum disulfides ($MoS_2$) applied on the ultrapure water layer.

In one particular embodiment, the predetermined amount of pure water may be in the range of 1 µL to 5 µL for per $cm^2$ of the target substrate and the temperature of pure water may be in the range of $20°$ C. to $80°$ C. If the amount of water use is excessive or inadequate, the desired reduction in lubrication would be affected.

In another embodiment, in the step of cooling down the target substrate, the temperature may be lowered to $-10°$ C. to $-40°$ C.

In the step of the subliming the surrounding area of the ice layer not covered by the molybdenum disulfides ($MoS_2$) layer, it may be conducted dry air or in vacuum.

Advantageously, the step of subliming and thinning may be conducted until the two-dimensional (2D) ice layer structure reaches a thickness in the range of 0.5 nm to 5 nm.

According to a second aspect of the present invention, there is provided a method of enhancing lubrication of moving parts in conditions with a temperature between $-100°$ C. to $0°$ C. and a humidity between 5% to 100%, comprising a method of generating a first lubrication interface as described. This method addresses the major problem of low temperature degraded lubricating performance of commercial oi-based and solid-states lubricants as well as cut down on energy/chemical consumption in defrosting/removing ice cover during the winter in temperate countries.

Preferably, the lubrication enhancing method may be free of using an oi-based lubricant.

Suitably, the lubrication enhancing method may include a two-dimensional solid-state lubricant different from the first lubricant. The two-dimensional solid-state lubricant different from the first lubricant may for example be $MoS_2$ sold under MOLYKOTE®, $MoS_2$ dry film sold by Chemodex Limited, etc.

According to a third aspect of the present invention, there is provided a lubricant comprising molybdenum disulfides ($MoS_2$) and water, wherein the ratio of ($MoS_2$) to water is 1/5 to 1/1 (v/v).

Preferably, the lubricant may consist of molybdenum disulfides ($MoS_2$) and water.

According to a fourth aspect of the present invention, there is provided a method of reducing friction between a moving part relative to a stationery part in a low temperature and high humidity environment, comprising a step of coating the moving part with a molybdenum disulfides ($MoS_2$) layer.

BRIEF DESCRIPTION TO THE DRAWINGS

The patent or application file contains at least one drawing executed in color. Copies of this patent or patent application publication with color drawing(s) will be provided by the Office upon request and payment of the necessary fee.

Some embodiments of the present invention will now be explained, with reference to the accompanied drawings, in which:

FIGS. 1a to 1d illustrate a removable two-dimensional (2D) ice layer confined by 1L-$MoS_2$, in which FIG. 1a is a schematic diagram illustrating a slippery two-dimensional (2D) ice layer under $MoS_2$, pushed away by the AFM probe, FIG. 1b is a topographic image of the two-dimensional (2D) ice layer under $MoS_2$ measured using non-contact mode of AFM, FIG. 1c is a zoom-in topographic 3D image, corresponding to the (blue) dashed-line square in FIG. 1b, and FIG. 1d is a topographic image of clean $MoS_2$ after the two-dimensional (2D) ice layer is pushed away by the AFM probe in contact mode at cryogenic temperature. The inset is the topographic image measured using non-contact mode showing that the ice flakes (marked by red triangles) are pushed to the square edge of the scanning area. [Scale bar in FIG. 1b and FIG. 1d=4 μm.]

FIG. 2a to FIG. 2e illustrate a reduced friction by the two-dimensional (2D) ice layer insertion under 1L-$MoS_2$, in which FIG. 2a illustrate a friction force distribution on $MoS_2$ with the two-dimensional 2D ice layer being removed by the AFM probe [scale bar=5 μm], FIG. 2b and FIG. 2c are topographic images of specific areas of $MoS_2$ with and without underlying 2D ice layer, respectively, wherein the blue dashed square and the red dashed square correspond to the dashed squares in FIG. 2a [scale bar=2 μm], FIG. 2d is a graph showing the line profile of friction signal and its corresponding topography prior to the 2D ice layer removal, and FIG. 2e is a graph showing the summarized friction force of $SiO_2$ substrate and $MoS_2$ with/without underlying ultra-slippery two-dimensional (2D) ice layer.

FIGS. 3a to 3d illustrate water-to-ice transition in two-dimensional (2D) confined space, in which FIG. 3a shows the force curves of 1L-$MoS_2$ on the substrate and on water droplet, FIG. 3b and FIG. 3c are topographic and friction images of water droplets confined by 1L-$MoS_2$ using AFM contact mode [scale bar=400 nm], wherein the line profiles extracted from FIG. 3b (blue line) and FIG. 3c (red line) show that the lowest points in the middle of water droplet is about 0.25 nm that is equal to the 2D ice single layer thickness and corresponding to the friction dropped point, and FIG. 3d is a schematic diagram illustrating the AFM probe scanning over the water droplet and enabled water-to-ice transition under the compressive force.

FIG. 4a is a schematic diagram illustrating the experimental set up for the in-situ AFM characterization of two-dimensional (2D) ice layer confined under the 1L-$MoS_2$; FIG. 4b is a schematic diagram illustrating the ice layer formed between a growth substrate and a target substrate; FIG. 4c is a schematic diagram illustrating the detachment of the growth substrate the $MoS_2$ remained on the ice surface; and FIG. 4d is a schematic diagram illustrating the 1L-$MoS_2$/2D ice layer remained on the growth substrate for characterization.

FIGS. 5a to 5e are optical images of 1L $MoS_2$, in which FIG. 5a and FIG. 5b are a bright field optical image and a dark field optical image, respectively, of as-grown 1L-$MoS_2$ on $SiO_2$/Si substrate, FIG. 5c and FIG. 5d are a bright field optical image and FIG. 5d are a dark field optical image, respectively, of 1L-$MoS_2$ transferred onto the target $SiO_2$/Si substrate [scale bar=20 μm], and FIG. 5e is a graph showing the corresponding Raman signal of as-grown and transferred 1L-$MoS_2$ on the 300-nm $SiO_2$/Si substrate.

FIG. 6a are the AFM topographic images of 2D ice layer under 2D $MoS_2$ at cryogenic temperature (CT) and at room temperature (RT), and FIG. 6b is a graph in which the extracted line profiles from FIG. 6a show the thickness of 2D ice layer in CT (black line) and RT (red line), wherein when comparing with the thickness of 2D ice layers at CT, the thickness at RT is slightly deceased by ca. 0.3 nm, which is close to the thickness of the monolayer of 2D hexagonal ice.

FIGS. 7a to 7e illustrate observation of 2D ice layer under $MoS_2$, in which FIG. 7a is a bright optical microscopy (OM) image, and FIG. 7b is a dark field optical microscopy (OM) image and FIG. 7c is a corresponding AFM topographic image, respectively, of transferred 1L-$MoS_2$ on 300 nm-$SiO_2$/Si substrate, wherein the 2D ice layer is invisible under OM and only observable with AFM. FIG. 7d the Raman and FIG. 7e the PL signal of 1L-$MoS_2$ with and without 2D ice layer, respectively, are almost same, indicating that these 2D ice layers have a neglectable weak contact with the 1L-$MoS_2$.

FIG. 8a is the AFM topographic image of the 2D ice layer removed from the confined area and turned to the liquid phase which was draining from the cracks on 1L-$MoS_2$ flake, and FIG. 8b is a graph showing the line profile of 1L-$MoS_2$ after removal of the 2D ice layer.

FIG. 9 is a schematic diagram illustrating the relative motions of AFM probe and the 2D ice layer and the force occurred on each position to elucidate the lubricating effect of 2D ice layer, wherein the friction force W measured by the probe balances with the counter force $f_1$ (W=$f_1$) caused by the adhesion of probe/$MoS_2$ interface. However, with the highly slippery 2D ice layer, friction at the stationary probe/$MoS_2$ interface and friction at the ice/$SiO_2$ interface ($f_3$) are negligible, instead, the friction at the $MoS_2$/2D ice interface ($f_2$) will mainly contribute to the measured friction of the probe (W'=$f_2$).

FIG. 10a and FIG. 10b are the AFM topographic images by non-contact mode before and after 1×1 μm window of clean $MoS_2$ without 2D ice layer opening (corresponds to the blue dash-line square in FIG. 10a. The height at the above window edge after opening is ca. 1.65 nm lower than the surrounding intact $MoS_2$/2D ice area, and 5 nm lower than the $MoS_2$ with ice layer underneath. Thereby the contributed thickness of 2D ice layer is close to the other confined ultrathin 2D ice layers as discussed above. By subtracting the $MoS_2$/substrate space reduction, the 2D ice layer here has a thickness of approximately 4 layers of 2D ice (~1 nm).

FIG. 10c and FIG. 10d are the modulus and adhesion force distribution of area corresponding to the area in FIG. 10b [Scale bar=500 nm].

FIG. 10e is a graph showing the friction coefficients on different areas corresponding to the number marking in FIG. 10b and sample transferred by PMMA assisted method given in below FIG. 11a.

Figure 11A:
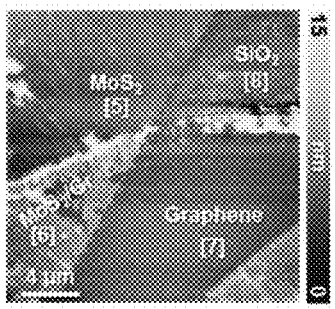
Figure 11B:
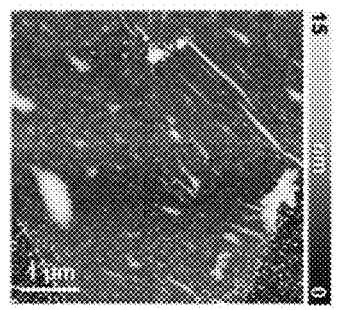
Figure 11C:
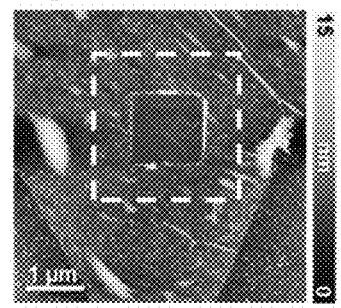

FIG. 11a is the AFM topographic image of MoS$_2$/graphene heterostructure prepared by PMMA assisted transfer method; FIGS. 11b and 11c are topographic images of 1L-MoS$_2$ transferred by PMMA method before and after the 1×1 µm area (marked by dashed-line blue square) was scanned by the contact mode; and FIG. 11d, the modulus and FIG. 11e, the adhesion force distribution of area, correspond, respectively, to the area marked by dashed-line white square in FIG. 11c.

Figure 12A:
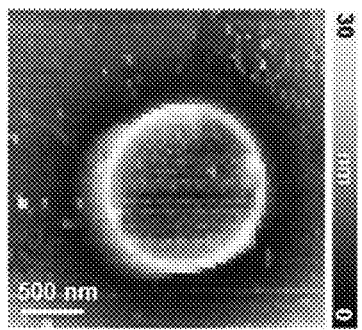
Figure 12B:
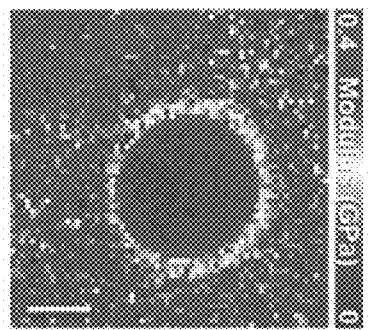
Figure 12C:
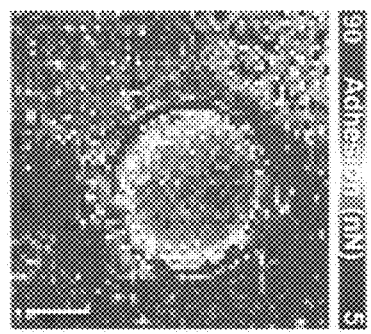

FIG. 12a is the AFM topographic image and corresponding FIG. 12b modulus and FIG. 12c adhesion force distribution of 1L-ReS$_2$ suspended on the hole at the TEM grid. The suspended area has lower modulus and adhesion compared with the area supported by carbon film.

Figure 13A:
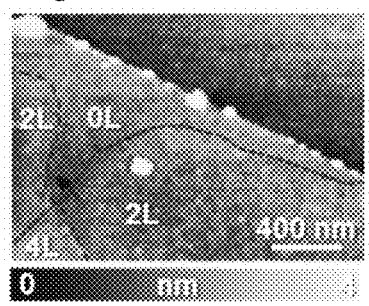
Figure 13B:
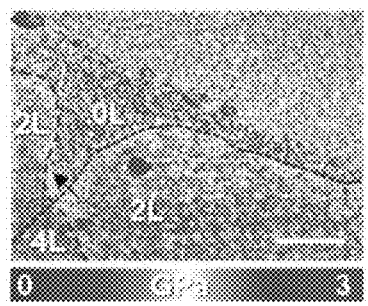
Figure 13C:
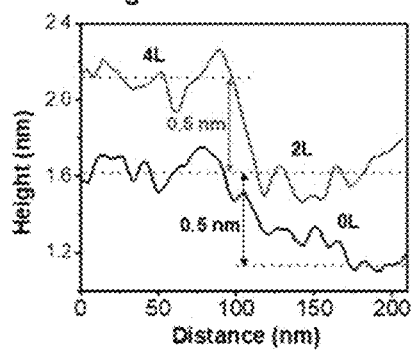
Figure 13D:
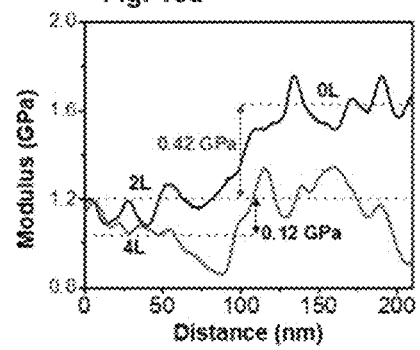

FIG. 13a is the AFM topographic image and FIG. 13b modulus distribution of 1L-MoS$_2$ with different underlying 2D ice layer thickness from zero (0L) to 4 layers (4L) [Scale bar=400 nm]. FIG. 13c and FIG. 13d are the line profiles of height and modulus corresponding to the black and red arrows in FIG. 13a and FIG. 13b, respectively.

Figure 14A:
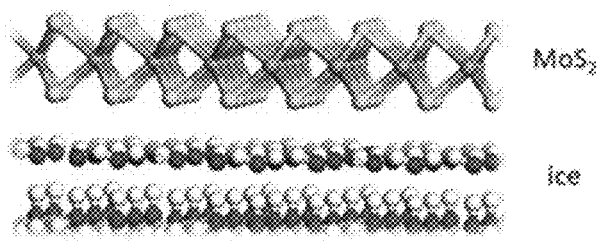
Figure 14B:
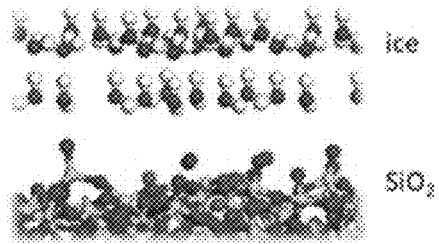
Figure 14C:
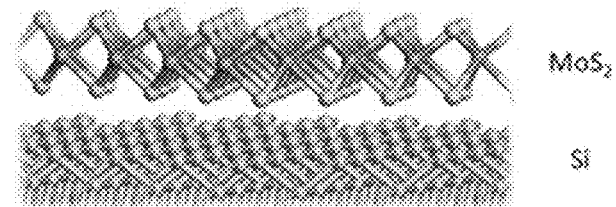
Figure 14D:
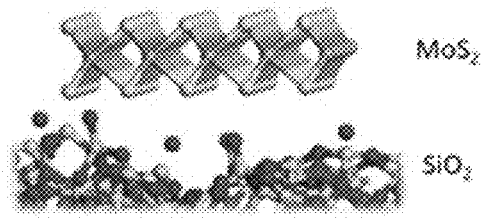

FIG. 14a to FIG. 14d are atomistic models by DFT calculations for the interfaces, in which FIG. 14a represents MoS$_2$/2D ice, FIG. 14b represents 2D ice/SiO$_2$, FIG. 14c represents MoS$_2$/Si and FIG. 14d represents MoS$_2$/SiO$_2$.

FIG. 15a to FIG. 15d are the AFM topographic images of water bumps under 1L-MoS$_2$ in which FIG. 15a illustrates before and FIG. 15b illustrates after the contact mode scan. FIG. 15c and FIG. 15d are the zoom-in images corresponding to the blue dashed-line square in FIG. 15a and FIG. 15b, respectively.

DETAILED DESCRIPTION OF PREFERRED EMBODIMENTS OF THE INVENTION

Low temperature and high humid conditions significantly degrade the performance of solid-state lubricants consisting of van der Waals (vdW) atomic layers, owing to the liquid water layer attached/intercalated to the vdW layers, which greatly enhances the interlayer friction. Nevertheless, during the course leading to the present invention, it is demonstrated that, using low temperature in situ atomic force microscopy (AFM) and friction force microscopy (FFM), the unexpected ultra-low friction between two-dimensional (2D) ice, a solid phase of water confined to the 2D space, and the 2D molybdenum di-sulphides (MoS$_2$). In the context of the present invention, low temperature and high humid conditions refers to a temperature between −100° C. to 0° C. and a humidity between 5% to 100%. By two-dimensional (2D) space, it refers to a very thin confinement with a thickness of 0.5 to 5 nm. The friction of MoS$_2$ and 2D ice is reduced by up to more than 30% as compared to bare MoS$_2$ and rigid surface. Phase transition of liquid water into 2D ice under mechanical compression is also achieved. The significant reduction in friction is advantageous in different contexts, e.g. allowing novel frictionless water/ice transport technology in nanofluidic systems, high-performance lubricants for operating at low temperature and high humid environments.

The present invention is concerned with the unprecedented reduction in friction in a low temperature high humidity environment. One aspect of the present invention is concerned with the preparation of an ultrathin 2D ice confined to 2D MoS$_2$ mono-atomic layer via atomic force microscopy (AFM) and friction force microscopy (FFM). Even though in conventional systems water/humidity tends to increase the friction observed by FFM, in the present invention the presence of 2D ice actually lowers the surface friction measured on MoS$_2$ by up to over 30%. This significant and unexpected reduction in friction is attributed to the ultrahigh lubricity between the 2D ice and MoS$_2$. Furthermore, the entire 2D ice layer under the MoS$_2$ can be easily "pushed" and removed by the scanning AFM tip hence showing excellent dynamics of the 2D ice confined to the 2D vdW layers. The present invention suggests that although either low temperature or high humid conditions would hamper the lubricity performances of solid-state lubricants, a combined low temperature and high humid effect could oppositely benefit the lubricity by the intercalated 2D ice. Further, the low efficiency of water transportation in vdW layered materials due to the high interfacial friction would be mitigated by reducing the thickness of water/ice (confine the water layer into 2D scale) or by reducing the temperature to enable the 2D ice formation. Hence, in the point of energy saving, it is promising to employ 2D ice for water or water-based solution transportation, instead of using the conventional liquid state for transportation.

EXPERIMENTS

Figures 1A, 1B, 1C, 1D:
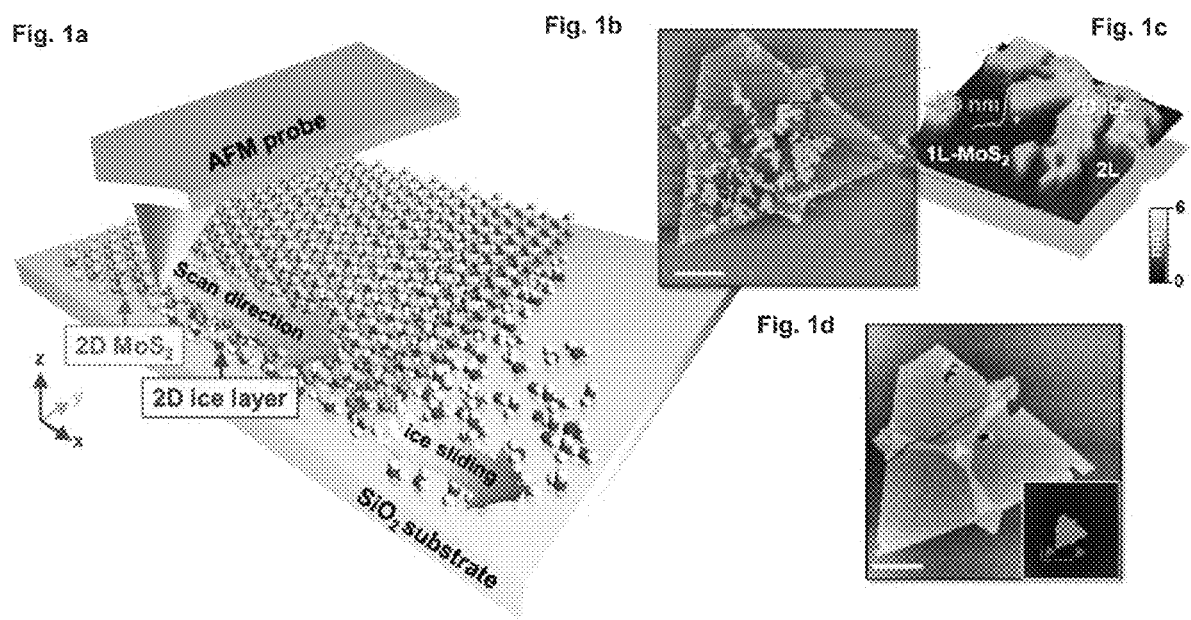

In experiments leading the present invention, in-situ AFM was employed to investigate the interaction between 2D MoS$_2$/ice, in particular the tribology characteristics of the water and 2D ice capsulated by a single layer-MoS2 (1L-MoS$_2$) (see Methods and FIGS. 4a-4d). In the particular experiments, the thickness of the 1L-MoS$_2$ is about 0.65 nm, although in other experiments the workable thickness may range from 0.5 nm to 5 nm. As ultrapure water is the only solvent used in the whole process, the 1L-MoS$_2$ on target substrate is thoroughly clean (FIGS. 5a to 5e). Interestingly, the 2D ice layer confined to 1L-MoS$_2$ exhibits ultrahigh lateral lubricity. The confined 2D ice can readily slide away following the scanning AFM tip in contact mode by applying a small compressive force of 1 nN (FIG. 1a). Prior to sliding the 2D ice, AFM topographic image (FIG. 1b) is measured in non-contact mode, which shows the existence of 2D ice layer under MoS$_2$. The zoom-in 3D layout in FIG. 1c shows 2D ice layer with a uniform thickness of about 3.8 nm. The 2D ice layer generated in this case is thicker than the 2D water layer formed by humid intercalation, where the reported thickness is ca. 0.5 nm. Afterwards, sliding of the 2D ice layer is conducted by utilizing the AFM tip in contact mode followed by taking a second time AFM topographic imaging in non-contact mode (FIG. 1d). It shows an ultraclean 2D MoS$_2$ sample with all the 2D ice layer underneath completely removed. The FIG. 1d inset provides the zoom-out view, showing that the residue ice flakes are accumulated along the edges of the square sampling window of the previous AFM scan in contact mode.

Figure 6A:
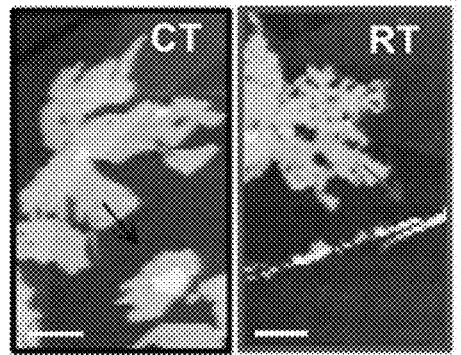
Figure 6B:
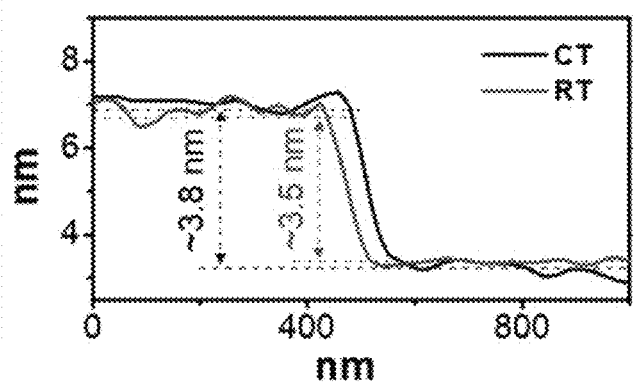
Figure 7A:
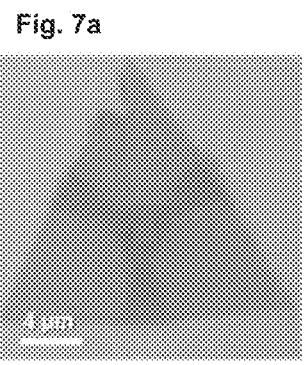
Figure 7B:
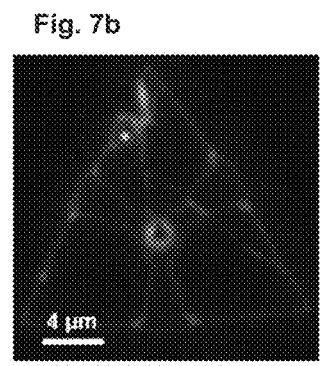
Figure 7C:
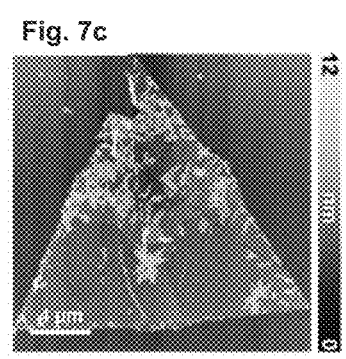
Figure 7D:
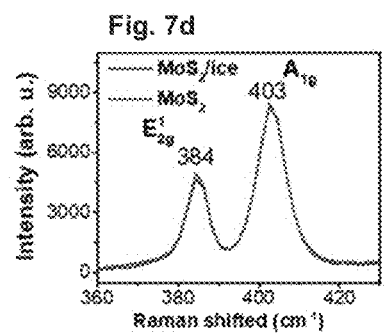
Figure 7E:
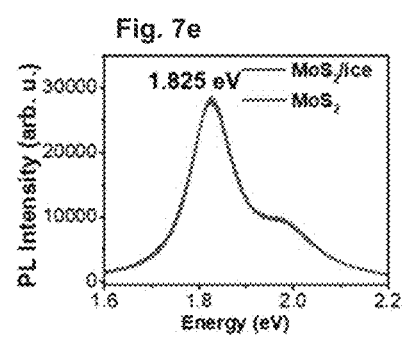

In previous studies, the 2D water intercalation in the confined area led to initial space expansion and internal pressure reduction that prevents the movement of 2D water layer. Distinctly, in present case the 2D ice layer is originated from the bulky ice film. When this bulky ice film sublimed it spontaneously turned into the 2D ice layer under MoS$_2$. Therefore, the formed 2D ice layer is highly slippery in contrast to the stationary 2D water layer previously reported. It is to be noted that the 2D ice layer under MoS$_2$ can tolerate the room temperature (RT) conditions without melting or sublimation, with only some surface coarsening (FIGS. 6a to 6b). The 2D ice layer did not affect the intrinsic optical properties of MoS$_2$ as well (FIGS. 7a to 7e), indicating the ignorable interaction at its interface.

Next, the surface friction of MoS$_2$ with the underlying 2D ice layer is measured using friction force microscope (FFM)

Figure 2A:
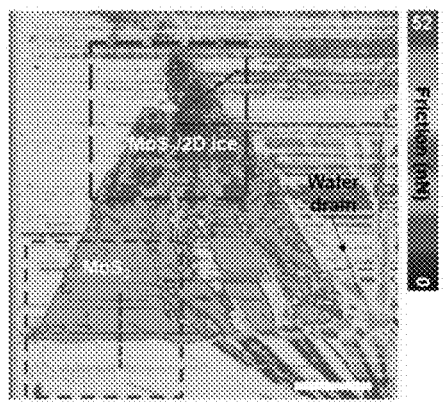
Figure 2B:
Figure 2D:
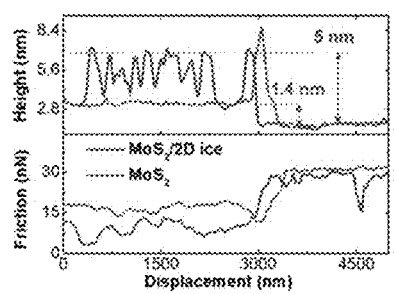
Figure 2E:
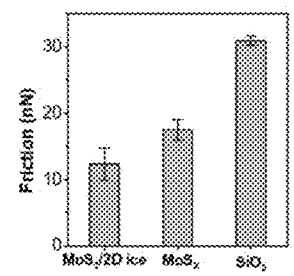
Figure 8A:
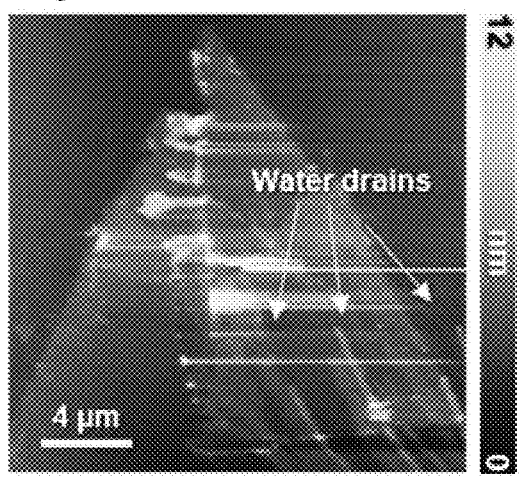
Figure 8B:
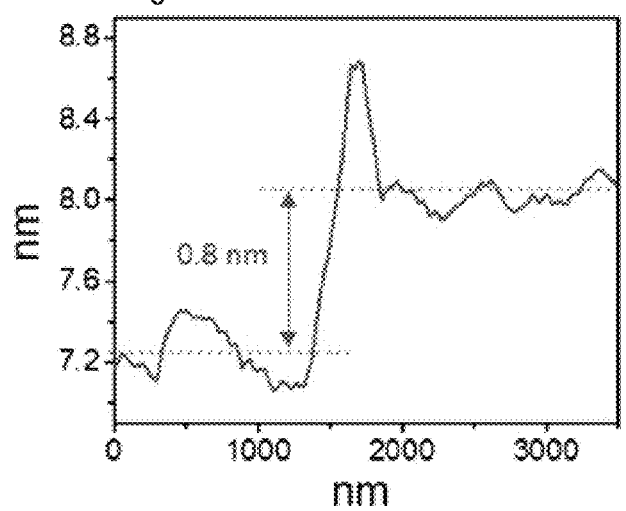

(see Methods). FIG. 2a displays the surface friction results on $MoS_2$ when the 2D ice layers are being removed by the AFM tip. Friction of $SiO_2$ substrate is about 2 times higher than that on $MoS_2$ surface, in line with previous studies. Surprisingly, the friction on that triangle $MoS_2$ is not uniform, as shown in FIG. 2a, but segmented into two regimes: low friction (LF) regime on the top and high friction (HF) regime in the bottom. The AFM topographic images corresponding to LF and HF regimes are shown in FIG. 2b and FIG. 2c, respectively. The LF regime contains high density of 2D ice flakes under the 2D $MoS_2$, meanwhile the HF regime is nearly empty. Remarkably, the line profiles in FIG. 2d shows that the small 2D ice flakes located near the edge of HF regime (peak in the red topographic line) also locally decrease the friction at the edge. The calculated average friction for each regime as well as the substrate area, FIG. 2e, shows that the 2D ice layers underneath can lower the surface friction of $MoS_2$ by ca. 30% when compared to the clean $MoS_2$. In contrast, friction locally increases at the water drain lines (FIG. 2a and FIGS. 8a to 8b) that remain as a residue after the ice removal process. Thus, it is clarified that the solid 2D ice phase enhances lubricity, differing from the 2D water layer intercalation that normally increases the friction to 200-400%.

Figure 9:
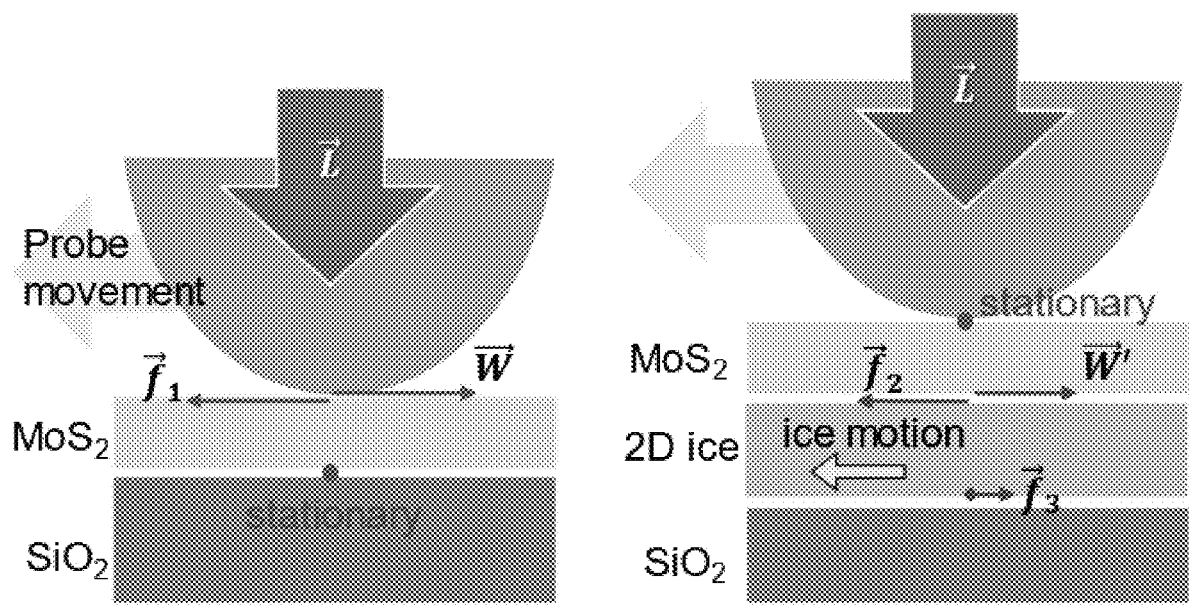

The ultrahigh lubricity of $MoS_2$/2D ice facilitates the relative motion of 2D ice along the AFM tip scanning (probe) direction (FIG. 9). The friction force W measured by the probe balances with the counter force $f_1$ ($W=f_1$) caused by the adhesion of probe/$MoS_2$ interface. However, if the underlying 2D ice layer is highly slippery, friction at the stationary probe/$MoS_2$ interface is negligible, instead, the friction at the $MoS_2$/2D ice interface ($f_2$) will mainly contribute to the measured friction of the probe ($W'=f_2$). Thus, our FFM results actually can reflect the friction forces at the probe/$MoS_2$ and $MoS_2$/2D ice interfaces for the clean $MoS_2$ and $MoS_2$/2D ice cases, respectively. The FFM measurements thus provide quantitative results of the ultralow friction between the $MoS_2$ and 2D ice layer. This is in accordance with the fact of easy sliding and mechanical removal of 2D ice layers under $MoS_2$.

According to the force mapping measured by the AFM (see Methods and FIGS. 10a to 10e), a clean $MoS_2$ regime exhibits higher modulus and adhesive force than the $MoS_2$/2D ice regime. The high modulus agreed with the fact that the clean 1L-$MoS_2$ is firmly contacted with the rigid substrate (FIG. 10c). Meanwhile, the change in adhesive force is directly relevant to the frictional behavior (FIG. 10d). The relation between friction and adhesion can be explained by the following equation:

$$W = \mu L = \mu(F_C + F_A)$$

where W is friction of identical material surface. $\mu$ is the friction coefficient. The normal load L equal to the sum of $F_C$, which is the compressive force applied on the surface, and $F_A$, which is the adhesive force of that surface. Therefore, the 2D ice layer under $MoS_2$ results in the adhesion decrease of ca. 2 nN on $MoS_2$ surface (FIG. 10d), in addition to the surface friction reduction.

Figure 11D:
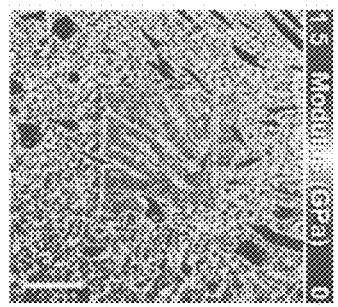
Figure 11E:
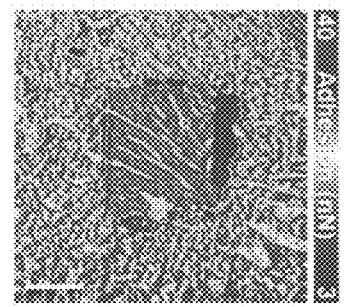

To evaluate the enhancement of 2D ice layer to the tribological performance of $MoS_2$, the localized friction curves using FFM was measured and the friction coefficient ($\mu$) values at different positions was calculated. Please see FIG. 10e. The blue zone displays the $\mu$ values on 4 different positions as labelled in FIG. 10b. Overall, the $\mu$ values of $SiO_2$ and $MoS_2$ in our results are comparable with the standard values. With the lubricating enhancement of 2D ice layer, the $\mu$ value of 0.18 is the smallest for $MoS_2$/2D ice interface which overwhelmed the tribological performance of other $MoS_2$-based lubricants (see Table 1). The $\mu$ value of 0.25 on the $MoS_2$/2D thick ice layer is higher than that on clean $MoS_2$ where $\mu$ is 0.22. This is because the thick 2D ice layer has inherent structure instability which is liable to surface coarsening. The $\mu$ values in the yellow zone (FIG. 10e) are measured for the 2D $MoS_2$ on $SiO_2$ substrate that was transferred by conventional PMMA method (see Methods and FIG. 11a). When compared with $MoS_2$/2D ice sample, the $\mu$ value is higher due to the PMMA residues after transfer which significantly increases the adhesion on the sample surface. Moreover, the behaviors of modulus and adhesion force of $MoS_2$/2D ice (FIGS. 10c and 10d) are similar to the modulus and adhesion results on wrinkles/puckers of $MoS_2$ (FIGS. 11b to 11d). The same reducing modulus and adhesion results were obtained on other suspended vdW atomic-thick layer like $ReS_2$ (FIGS. 12a to 12c), indicating that the $MoS_2$ is separated/delaminated from the underlying rigid substrates by the 2D ice layer. The modulus and adhesion forces also decrease with the increasing thickness of 2D ice layer (FIGS. 13a to 13d). That also suggests to the 2D ice layers acting as spacing/separating layer which screened 2D $MoS_2$ from the high friction substrates.

To understand the mechanism of ultrahigh lubricity interface, the magnitude of the interactions at the Si/$MoS_2$, $MoS_2$/2D ice, 2D ice/$SiO_2$ and 2D ice/Si interfaces was estimated by calculating the adhesion energies using density functional theory (DFT) (see Methods). The DFT calculation results clearly show that the adhesion energy between $MoS_2$ and Si is quite high at −0.65 eV/f.u., while $MoS_2$/$SiO_2$ and $MoS_2$/2D ice have medium adhesion energy of −0.30 eV/f.u. and −0.35 eV/f.u., respectively. 2D ice/$SiO_2$ and 2D ice/Si have low adhesion energies of −0.02 eV/f.u. and −0.12 eV/f.u., respectively. The respective atomic structures for these interfaces relaxed by DFT are shown in FIG. 14a to FIG. 14d. As a result, the AFM Si tip could keep stationary relative to the mobile $MoS_2$/2D ice interface underneath, as the adhesion energy between 2D ice/$MoS_2$ is much lower than Si/$MoS_2$. Thus, the friction data obtained by FFM corresponds to the friction force at the dynamical 2D ice/$MoS_2$ interface, considering the negligible friction of 2D ice/$SiO_2$ interface in the bottom ($f_3$ in FIG. 9). The ultrahigh lubricity experimentally measured at the $MoS_2$/2D ice interface indicates that the introduction of 2D ice at the $MoS_2$ interfaces significantly lowers the frictions of solid-state lubricants.

The calculation results also revealed the mechanism of the proper way to generate the low friction 2D ice layer under $MoS_2$. In our experiment, the bucky ice was solidified between $MoS_2$ and substrate and the ice surface contacted with $MoS_2$ had higher stability due to its considerable adhesion energy. This stable interface enabled $MoS_2$ transfer from growth substrate and supported the flat $MoS_2$ when the surrounding ice was sublimed (see schematics in FIGS. 4c to 4d). The ice surface contacted with $MoS_2$ became dominant when the ice thinning from bulk to 2D structure. Moreover, high polarization toward hydrogen bonding in $MoS_2$/2D ice interface also weakened the bonding of opposite 2D ice/$SiO_2$ interface that make 2D ice layer likely free standing on $SiO_2$ substrate, hence, a small lateral force from AFM probe can slide it away easily.

Figure 3A:
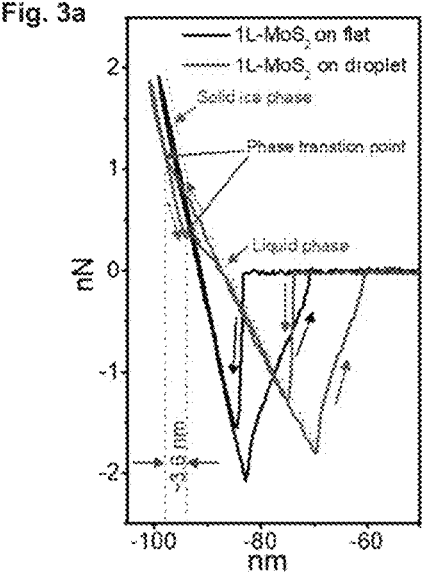

Apart from the 2D ice layer explained above, the water nano-droplets encapsulated under $MoS_2$ exhibit some unique characteristics, indicating the water-to-ice phase transition induced by compression. These encapsulated water nano-droplets have unusual elastic responses to the AFM probe indentation (FIG. 3a), evidenced by the two different force slopes (red line). The nonlinear behavior starkly differs from the linear increase measured at the flat sample areas (black line). The smaller slope corresponds to the compression stage on the liquid phase water encapsulated in the bump, while the high slope corresponds to the solid 2D ice phase, almost identical to the force slope on flat $MoS_2$ (black line). The slope transition point in the indentation move is lower than the slope transition point in the pull-off move by 3.6 nm, which agrees with the thickness of 2D ice layer we have observed above. Moreover, the transition point in pull-off move has a sudden drop when turning to smaller slope, indicating the probe is detached from the surface at that point and then re-contact after phase change. Noteworthily, the estimated vdW pressure between $MoS_2$ and $SiO_2$ surface $P_w = W_d/D \approx 50$ MPa, agreed with the limit pressure which enable the first-order freezing transition of water to ice in confinement space, where $W_d = 10.6 \pm 2$ meV/Å is the adhesion energy between $MoS_2/SiO_2$ interface and D=3.6 nm is the thickness of capsulated 2D ice.

Figure 3B:
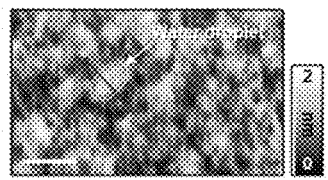
Figure 3C:
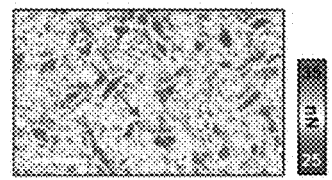
Figure 3D:
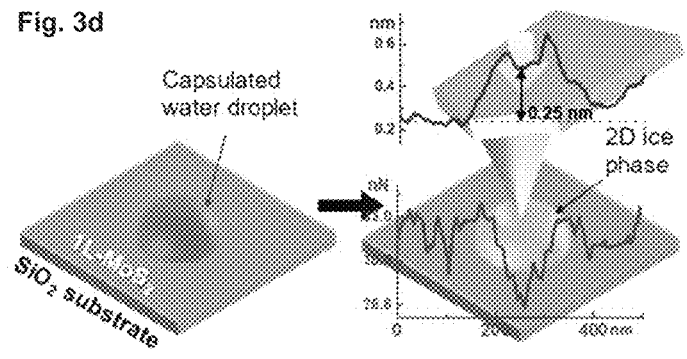

Further, the AFM probe scans over these water bumps to record their topography (FIG. 3b) and surface friction (FIG. 3c) and provides insights of the relation between water-to-ice transition and friction. In general, the low friction regimes are correlated with the water bumps under $MoS_2$. It I was also found that the liquid water is firmly sealed inside the bumps under 1L $MoS_2$ and cannot be removed by the contact mode scanning of the tip (FIGS. 15a to 15d), which is different from the 2D ice removal by the tip scanning as shown above. The extracted line profiles in FIG. 3d display the height drop at the centre of $MoS_2$ bump corresponding to the friction drop point. The minimum height of the $MoS_2$ bump is about 0.25 nm determined from the neighboring flat $MoS_2$, which is close to the thickness of monolayer 2D ice. These experiments provide direct evidence to the water-to-ice phase transition under compressive forces by AFM probe (FIG. 3d). It also indicates that the liquid water can transform into solid 2D ice by mechanical compression, which can further lubricate the interfaces between 2D materials and 2D ice.

The present invention has illustrated the abnormal tribological behavior of ultrathin 2D ice confined to the 2D vdW materials. Evidenced by an in-situ cryogenic AFM and FFM results, the ultrahigh lubricity of the 2D ice confined to 2D $MoS_2$ can be rationalized by the significantly reduced frictions at the $MoS_2/2D$ ice and 2D ice/$SiO_2$ interfaces as compared to the original $MoS_2$ surfaces. We also demonstrated the water-to-ice transition under 2D $MoS_2$ by mechanical compression. The unveiled ultrahigh lubricity at interface between 2D ice and 2D vdW materials, combined with the phase transition approach for producing ultrathin 2D ice from water, allows the application of the present invention in solid-state lubricants, nano mechanics and nanofluidic system working at low temperature and high humid conditions.

TABLE 1

The tribological performance of $MoS_2/2D$ ice layer compared with other $MoS_2$-based products

| $MoS_2$-based products | Coefficient of friction (μ) |
|---|---|
| Lubricate thin film | 0.22 |
| Solid lubricant | 0.8 |
| Lubricant composites | 0.44 |

TABLE 1-continued

The tribological performance of $MoS_2/2D$ ice layer compared with other $MoS_2$-based products

| $MoS_2$-based products | Coefficient of friction (μ) |
|---|---|
| Lubricant additive | 0.55 |
| Present invention: Bare $MoS_2$ | 0.22 |
| Present invention: $MoS_2/2D$ ice layer | 0.18 |

Methods

Sample Preparation $MoS_2$ synthesis: The growth of $MoS_2$ was performed at atmospheric pressure in a single zone furnace of 1-inch quartz tube. 5.5 mg $Na_2MoO_4 \cdot 2H_2O$ (>99%, Sigma-Aldrich, 331058) was loaded in the center of the furnace, and a $SiO_2$ (300 nm)/Si substrate was placed such that it faced the Mo source. 10 mg sulfur powder (99.998%, Sigma-Aldrich) was placed at the upstream of the furnace with a distance of 17.6 cm from the Mo source. After purged with Ar (300 sccm) for 10 minutes, the $MoS_2$ was grown at 810° C. for 10 min under a 200 sccm of Ar. Later, the furnace was allowed to reach the room temperature naturally.

$MoS_2$/2D ice layer sample preparation: The target substrate (300 nm-SiO2/Si) was secured on the temperature control stage inside the chamber of AFM E53000E system (Hitachi, Japan) (see FIG. 4a). To obtain a moisture free environment, a constant flow of $N_2$ at 0.5 mL/min was maintained throughout the measurement procedure. After 15 min of $N_2$ flow, a 1-2 μL droplet of ultrapure water heated at 90° C. or 20° C. (room temperature) was dropped on the target substrate. Next, 1L-$MoS_2$/grown substrate was lightly dropped up-side-down on the water droplets that created a sandwich structure from top to bottom: grown substrate/1L-$MoS_2$/water/target substrate. The chamber door was closed and liquid $N_2$ was inserted to cooling down the sample stage at the rate of 1° C./min. After the temperature reached −40° C., the chamber door was opened, and the grown substrate was detached immediately (FIGS. 1b and 1c). The 1L-$MoS_2$/2D ice layer remained on the growth substrate for characterization (FIG. 1d).

Transfer $MoS_2$ and $MoS_2$/graphene heterostructure sample: For comparison, a $MoS_2$ sample and $MoS_2$/graphene heterostructure sample have been prepared using conventional PMMA transfer method. A thin layer of Poly (methyl methacrylate) (PMMA) (A4, MicroChem) film was spin-coated on the as-grown sample at a speed of 3000 rpm for 60 sec. Next, the PMMA/$MoS_2$ has been detached from the growth substrate by using hot KOH 1M solution. Afterwards, the PMMA/$MoS_2$ has been wash with DI water for 3 times before it was picked-up onto the target $SiO_2$ substrate or transferred to 1L-graphene/$SiO_2$ substrate utilizing the dry transfer method.

The 1L-graphene has been grown on 75 μm-thick copper (Cu) foil (99.95%, Goodfellow, England) using the tube furnace maintained at 1050° C. The H2 and CH4 gas have been inserted to the heating tube at the ratio of 1:50 for 2 hrs. Later the furnace was allowed to cooldown to the room temperature. Next, a thin layer of PMMA was spin-coated onto the 1L-graphen/Cu foil sample. The Cu foil was etched away by copper etchant (Sigma-Aldrich, 667528). The remained PMMA/1L-graphene has been washed by DI water for 3 times and then was picked up onto the target SiO2 substrate. Samples have been placed into the oven at 60° C. for 2 hrs to dry out all the water and then PMMA layers have been removed by acetone.

AFM measurement: The topographic images were obtained using AFM5300E system (Hitachi, Japan). In order to preserve the 2D ice surface, the Sampling Intelligent Scan (SIS) mode has been used for the observation. A Si-DF3 cantilever (Hitachi, Japan) with approximately 10 nm tip curvature was employed for this purpose. The spring constant of cantilever was about 1.4-1.6 nN/m. Note that the SIS mode is a non-contact mode in which probe only approaches near to the surface at the measuring point. Later, the probe was pulled up to 10 nm and moved to next measurement point. This minimized the heat transfer between the probe and surface. The original surface of the $MoS_2$/2D ice layer has been preserved during the measurements and the sample stage has been kept constantly at <−20° C.

AFM contact mode has been done on 1L-$MoS_2$/target substrate sample in order to remove the underlying 2D ice or water. A Si-DF3 cantilever under constant compressive force of 1 nN between the probe and surface was employed and the scanning speed were kept at 0.4-0.5 Hz.

Friction Force Microscope (FFM) has been done to obtain the friction force distribution on 1L-$MoS_2$. For this purpose, a Si-DF3 cantilever under different compressive force from 0 to 70 nN between probe and surface was used. To minimize the humidity effects, 5 sccm of dry N2 flow was inserted to the AFM chamber. The scanning speed were kept at 0.5 Hz and scan direction was turned to −90°.

Force mapping: The force curve mapping has been measured using a Si-DF3 cantilever. Prior to the measurement, the tip radius has been estimated using the needle-shape Si grating sample (TGT1, K-TEK). Next, the probe was pressed on the ideal flat Si surface to calculate the sensitivity of the detector in the Z-direction displacement of the probe (DIF sensitivity). The DIF sensitivity for Si-DF3 cantilever is about 7-8 mV/mm. The mapping has been performed on the desired area with the resolution of 256×256 points. In each single point, the tip at first pulled up to 100 nm then moved-in for 110 nm toward the sample surface and a force curve (F-d curve) has been detected respectively to the tip movement.

Photoluminescence (PL) and Raman measurement: The PL and Raman spectra of $MoS_2$ samples were carried out using the confocal Raman system (Renishaw Raman Spectroscopy 2000, UK) with the 514 nm excitation laser. The single spectra were measured under the 50× lens (0.75 N.A.) with the laser spot size of ~500 nm and the exposure time of 10 s.

Density Functional Theory Calculation: Spin-polarized density function theory (DFT) calculations are performed by using the Vienna ab initio Simulation Package (VASP) program package within the projector augmented wave (PAW). The exchange-correlation interactions are described with the generalized gradient approximation (GGA) in the form of the Perdew, Burke, and Ernzernhof (PBE) functional. The kinetic energy cutoff for the plane-wave basis set is chosen as 400 eV, and the distance of vacuum layer is set to be more than 20 Å, which is sufficiently large to avoid interlayer interactions. The DFT-D3 scheme of Grimme for the vdW correction is applied to obtain the interactions of 2D-substrates and adsorbates. The electronic SCF tolerance is set to 10-4 eV. The internal coordinates of adsorbates including $MoS_2$ and 2D ice have been fixed. The optimized distances between various substrates and adsorbates are determined by scanning the Z directions until the energy reaches the lowest value with the gamma point sampling. Amorphous SiO2 structure used as a substrate in this study is from Materials Studio program library based on the previous study. Other unit cells of substrates' structures are obtained by optimizing all atomic positions and lattice constants until the Hellmann-Feynman forces are less than 0.02 eV/Å with 15×15×1 k-points samplings.

It should be understood that certain features of the invention, which are, for clarity, described in the content of separate embodiments, may be provided in combination in a single embodiment. Conversely, various features of the invention which are, for brevity, described in the content of a single embodiment, may be provided separately or in any appropriate sub-combinations. It is to be noted that certain features of the embodiments are illustrated by way of non-limiting examples. For example, while aspects of the present invention includes methods of generating a lubrication interface and methods of enhancing lubrication of moving parts, the present invention also includes lubricants or lubricating additives, methods of enhancing lubrication performance of conventional lubricants by adding, for example, a composition comprising a two-dimensional (2D) lubricant/additive having a two-dimensional material-water complex wherein the ration of the two-dimensional material and water is from 1:5 to 1:1 (v/v), as shown by experiments leading to the present invention.

Further, the present invention can be applied in the context of maintaining outdoor traffic and machinery during extreme cold weather with low temperature and/or high humidity. The aforementioned lubricants or additive for lubricants can be used for vehicle engines and drive train parts, aeroplane engines and mechanical parts, drilling machine for mining, compressors, pumps, chucks, collets and tools, etc.

This present invention also can be applied for road/railway coating to prevent ice blocking issue and maintain smooth traffic traveling, which totally exempts the energy or chemical consumption in defrosting/removing ice cover during winter. For example, $MoS_2$ can be coated on the wheels. When running through the snow-covered road/railways, the snow under the compressive force between $MoS_2$ on wheels will be turned into lubricating 2-dimensional ice for reducing the friction between wheels and road/railways.

The following references are incorporated in their entirety and a skilled person is considered to be aware of disclosure of these references.

W. L. Karpen et al. Lubricant containing MoS2, lubricating process, and lubricated workpiece. U.S. Pat. No. 631,732 (1975).

H. Li et al. Superlubricity between MoS2 Monolayers. Adv. Mater. 29, 27 (2017).

X. Y. Zhao, et al. Transition from Thermal to Athermal Friction under Cryogenic Conditions. Phys. Rev. Lett. 102, 18 (2009).

X. Y. Zhao et al. The Role of Water in Modifying Friction within MoS2 Sliding Interfaces. ACS Appl. Mater. Inter. 2, 5, 1444-1448 (2010).

R. Zangi et al. Monolayer ice. Phys. Rev. Lett. 91, 2 (2003).

R. Zangi et al. Bilayer ice and alternate liquid phases of confined water. J. Chem. Phys. 119, 3, 1694-1700 (2003).

H. Lee et al. Nanoscale Friction on Confined Water Layers Intercalated between MoS2 Flakes and Silica. J. Phys. Chem. C 123, 14, 8827-8835 (2019).

M. Marian et al. Layered 2D Nanomaterials to Tailor Friction and Wear in Machine Elements-A Review. Adv. Mater. Interfaces 9, 3 (2022).

Lee, C.; Li, Q. Y.; Kalb, W.; Liu, X. Z.; Berger, H.; Carpick, R. W.; Hone, J., Frictional Characteristics of Atomically Thin Sheets. Science 2010, 328 (5974), 76-80.

Spear, J. C.; Ewers, B. W.; Batteas, J. D., 2D-nanomaterials for controlling friction and wear at interfaces. Nano Today 2015, 10 (3), 301-314.

Chhowalla, M.; Amaratunga, G. A. J., Thin films of fullerene-like MoS2 nanoparticles with ultra-low friction and wear. Nature 2000, 407 (6801), 164-167.

Rosenkranz, A.; Righi, M. C.; Sumant, A. V.; Anasori, B.; Mochalin, V. N., Perspectives of 2D MXene Tribology. Adv Mater 2022, 2207757.

Wyatt, B. C.; Rosenkranz, A.; Anasori, B., 2D MXenes: Tunable Mechanical and Tribological Properties. Adv Mater 2021, 33 (17), 2007973.

Dienwiebel, M.; Verhoeven, G. S.; Pradeep, N.; Frenken, J. W. M.; Heimberg, J. A.; Zandbergen, H. W., Superlubricity of graphite. Phys. Rev. Lett. 2004, 92 (12), 126101.

Deng, Z.; Smolyanitsky, A.; Li, Q. Y.; Feng, X. Q.; Cannara, R. J., Adhesion-dependent negative friction coefficient on chemically modified graphite at the nanoscale. Nat. Mater. 2012, 11 (12), 1032-1037.

Li, H.; Wang, J. H.; Gao, S.; Chen, Q.; Peng, L. M.; Liu, K. H.; Wei, X. L., Superlubricity between MoS2 Monolayers. Adv. Mater. 2017, 29 (27), 1701474.

Tonge, P.; Roy, A.; Patel, P.; Beall, C. J.; Stoyanov, P., Tribological Evaluation of Lead-Free MoS2-Based Solid Film Lubricants as Environmentally Friendly Replacements for Aerospace Applications. Lubricants 2022, 10 (1), 7.

Liu, L. C.; Zhou, M.; Jin, L.; Li, L. C.; Mo, Y. T.; Su, G. S.; Li, X.; Zhu, H. W.; Tian, Y., Recent advances in friction and lubrication of graphene and other 2D materials: Mechanisms and applications. Friction 2019, 7 (3), 199-216.

Berman, D.; Erdemir, A., Achieving Ultralow Friction and Wear by Tribocatalysis: Enabled by In-Operando Formation of Nanocarbon Films. ACS Nano 2021, 15 (12), 18865-18879.

Li, Y. H.; Yu, C. B.; Gan, Y. Y.; Jiang, P.; Yu, J. X.; Ou, Y.; Zou, D. F.; Huang, C.; Wang, J. H.; Jia, T. T.; Luo, Q.; Yu, X. F.; Zhao, H. J.; Gao, C. F.; Li, J. Y., Mapping the elastic properties of two-dimensional MoS2 via bimodal atomic force microscopy and finite element simulation. npj Comput. Mater. 2018, 4 (1), 1-8.

Pham, V. T.; Fang, T. H., Thermal and mechanical characterization of nanoporous two-dimensional MoS2 membranes. Sci. Rep. 2022, 12 (1), 1-7.

Yan, Z. C.; Xu, D.; Lin, Z. Y.; Wang, P. Q.; Cao, B. C.; Ren, H. Y.; Song, F.; Wan, C. Z.; Wang, L. Y.; Zhou, J. X.; Zhao, X.; Chen, J.; Huang, Y.; Duan, X. F., Highly stretchable van der Waals thin films for adaptable and breathable electronic membranes. Science 2022, 375 (6583), 852-859.

Zhao, X. Y.; Phillpot, S. R.; Sawyer, W. G.; Sinnott, S. B.; Perry, S. S., Transition from Thermal to Athermal Friction under Cryogenic Conditions. Phys. Rev. Lett. 2009, 102 (18), 186102.

Hasz, K. R.; Vazirisereshk, M. R.; Martini, A.; Carpick, R. W., Bifurcation of nanoscale thermolubric friction behavior for sliding on MoS¬2. Phys. Rev. Mater. 2021, 5 (8), 083607.

Lavini, F.; Calo, A.; Gao, Y.; Albisetti, E.; Li, T. D.; Cao, T. F.; Li, G. Q.; Cao, L. Y.; Aruta, C.; Riedo, E., Friction and work function oscillatory behavior for an even and odd number of layers in polycrystalline MoS2. Nanoscale 2018, 10 (17), 8304-8312.

Zhao, X. Y.; Perry, S. S., The Role of Water in Modifying Friction within MoS2 Sliding Interfaces. ACS Appl. Mater. Inter. 2010, 2 (5), 1444-1448.

Levita, G.; Righi, M. C., Effects of Water Intercalation and Tribochemistry on MoS2 Lubricity: An AbInitio Molecular Dynamics Investigation. Chem. Phys. Chem. 2017, 18 (11), 1475-1480.

Tang, B. Y.; Tang, C.; Chen, L.; Xiao, C.; Rosenkranz, A.; Qian, L. M., Nanoscopic humidity-dependent adhesion behaviors of 2D materials. Appl. Surf. Sci. 2022, 572, 151394.

Arif, T.; Colas, G.; Filleter, T., Effect of Humidity and Water Intercalation on the Tribological Behavior of Graphene and Graphene Oxide. ACS Appl. Mater. Inter. 2018, 10 (26), 22537-22544.

Chen, Z.; He, X.; Xiao, C.; Kim, S. H., Effect of Humidity on Friction and Wear—A Critical Review. Lubricants 2018, 6 (3), 74.

Marian, M.; Berman, D.; Rota, A.; Jackson, R. L.; Rosenkranz, A., Layered 2D Nanomaterials to Tailor Friction and Wear in Machine Elements-A Review. Adv. Mater. Interfaces 2022, 9 (3), 2101622.

Babuska, T. F.; Pitenis, A. A.; Jones, M. R.; Nation, B. L.; Sawyer, W. G.; Argibay, N., Temperature-Dependent Friction and Wear Behavior of PTFE and MoS2. Tribol. Lett. 2016, 63 (2), 1-7.

Onodera, T.; Morita, Y.; Nagumo, R.; Miura, R.; Suzuki, A.; Tsuboi, H.; Hatakeyama, N.; Endou, A.; Takaba, H.; Dassenoy, F.; Minfray, C.; Joly-Pottuz, L.; Kubo, M.; Martin, J. M.; Miyamoto, A., A Computational Chemistry Study on Friction of h-MoS2 Part II Friction Anisotropy. J. Phys. Chem. B 2010, 114 (48), 15832-15838.

Han, S. H.; Choi, M. Y.; Kumar, P.; Stanley, H. E., Phase transitions in confined water nanofilms. Nat. Phys. 2010, 6 (9), 685-689.

Zangi, R.; Mark, A. E., Monolayer ice. Phys. Rev. Lett. 2003, 91 (2), 025502.

Zangi, R.; Mark, A. E., Bilayer ice and alternate liquid phases of confined water. J. Chem. Phys. 2003, 119 (3), 1694-1700.

Kwac, K.; Kim, I.; Pascal, T. A.; Goddard, W. K.; Park, H. G.; Jung, Y., Multilayer Two-Dimensional Water Structure Confined in MoS2. J. Phys. Chem. C 2017, 121 (29), 16021-16028.

Lee, H.; Jeong, H.; Suh, J.; Doh, W. H.; Baik, J.; Shin, H. J.; Ko, J. H.; Wu, J.; Kim, Y. H.; Park, J. Y., Nanoscale Friction on Confined Water Layers Intercalated between MoS2 Flakes and Silica. J. Phys. Chem. C 2019, 123 (14), 8827-8835.

Zhu, Y. B.; Wang, F. C.; Wu, H. A., Superheating of monolayer ice in graphene nanocapillaries. J. Chem. Phys. 2017, 146 (13), 134703.

Bampoulis, P., Temperature induced dynamics of water confined between graphene and MoS2. J. Chem. Phys. 2021, 154 (13), 134705.

Bampoulis, P.; Teernstra, V. J.; Lohse, D.; Zandvliet, H. J. W.; Poelsema, B., Hydrophobic Ice Confined between Graphene and MoS2. J. Phys. Chem. C 2016, 120 (47), 27079-27084.

Cunningham, G.; Lotya, M.; Cucinotta, C. S.; Sanvito, S.; Bergin, S. D.; Menzel, R.; Shaffer, M. S. P.; Coleman, J. N., Solvent Exfoliation of Transition Metal Dichalcogenides: Dispersibility of Exfoliated Nanosheets Varies Only Weakly between Compounds. ACS Nano 2012, 6 (4), 3468-3480.

He, J.; Sun, J.; Choi, J.; Wang, C.; Su, D., Synthesis of N-doped carbon quantum dots as lubricant additive to enhance the tribological behavior of MoS2 nanofluid. *Friction* 2023, 11 (3), 441-459.

Hirunpinyopas, W.; Prestat, E.; Worrall, S. D.; Haigh, S. J.; Dryfe, R. A. W.; Bissett, M. A., Desalination and Nanofiltration through Functionalized Laminar MoS2 Membranes. *ACS Nano* 2017, 11 (11), 11082-11090.

Zhang, K.; Arroyo, M., Adhesion and friction control localized folding in supported graphene. *J. Appl. Phys.* 2013, 113 (19), 193501.

Quereda, J.; Castellanos-Gomez, A.; Agrait, N.; Rubio-Bollinger, G., Single-layer MoS2 roughness and sliding friction quenching by interaction with atomically flat substrates. *Appl. Phys. Lett.* 2014, 105 (5), 053111.

Deng, K.; Ko, W. H., A study of static friction between silicon and silicon compounds. *J. Micromech. Microeng.* 1992, 2, 14-20.

Koga, K.; Gao, G.; Tanaka, H.; Zeng, X. C., Formation of ordered ice nanotubes inside carbon nanotubes. *Nature* 2001, 412 (6849), 802-805.

Deng, S.; Gao, E.; Xu, Z.; Berry, V., Adhesion energy of MoS2 thin films on silicon-based substrates determined via the attributes of a single MoS2 wrinkle. *ACS Appl. Mater. Inter.* 2017, 9 (8), 7812-7818.

Thi, Q. H.; Kim, H.; Zhao, J.; Ly, T. H., Coating two-dimensional $MoS_2$ with polymer creates a corrosive non-uniform interface. *Npj 2D Mater. Appl.* 2018, 2, 34.

Chae, S. H.; Yu, W. J.; Bae, J. J.; Duong, D. L.; Perello, D.; Jeong, H. Y.; Ta, Q. H.; Ly, T. H.; Vu, Q. A.; Yun, M.; Duan, X. F.; Lee, Y. H., Transferred wrinkled $Al_2O_3$ for highly stretchable and transparent graphene-carbon nanotube transistors. *Nat. Mater.* 2013, 12 (5), 403-409.

Huang, L. L.; Zheng, F. Y.; Deng, Q. M.; Thi, Q. H.; Wong, L. W.; Cai, Y.; Wang, N.; Lee, C. S.; Lau, S. P.; Chhowalla, M.; Li, J.; Ly, T. H.; Zhao, J., In Situ Scanning Transmission Electron Microscopy Observations of Fracture at the Atomic Scale. *Phys. Rev. Lett.* 2020, 125 (24), 246102.

Kresse, G.; Furthmuller, J., Efficient iterative schemes for ab initio total-energy calculations using a plane-wave basis set. *Phys. Rev. B* 1996, 54 (16), 11169-11186.

Blochl, P. E., Projector Augmented-Wave Method. *Phys. Rev. B* 1994, 50 (24), 17953-17979.

Perdew, J. P.; Burke, K.; Ernzerhof, M., Generalized gradient approximation made simple. *Phys. Rev. Lett.* 1996, 77 (18), 3865-3868.

Perdew, J. P.; Ernzerhof, M.; Burke, K., Rationale for mixing exact exchange with density functional approximations. *J. Chem. Phys.* 1996, 105 (22), 9982-9985.

Grimme, S.; Antony, J.; Ehrlich, S.; Krieg, H., A consistent and accurate ab initio parametrization of density functional dispersion correction (DFT-D) for the 94 elements H-Pu. *J. Chem. Phys.* 2010, 132 (15).

Vyas, S.; Dickinson, J. E.; Armstrong-Poston, E., Towards an understanding of the behavior of silanes on glass: an atomistic simulation study of glass surfaces. *Mol. Simulat.* 2006, 32 (2), 135-143.

Zangi, R.; Mark, A. E., Monolayer ice. *Phys. Rev. Lett.* 2003, 91 (2), 025502.

Vellore, A.; Romero, S.; Walters, N.; Johnson, D. A.; Kennett, A.; Heverly, M.; Martini, A., Ni-Doped $MoS_2$ Dry Film Lubricant Life. *Adv. Mater. Interfaces* 2020, 7, 2001109.

Mahathanabodee, S.; Palathai, T.; Raadnui, S.; Tongsri, R.; Sombatsompop, N., Dry sliding wear behavior of SS316L composites containing h-BN and $MoS_2$ solid lubricants. *Wear* 2014, 316(1-2), 37-48.

Wang, J.; Gu, M.; Songhao, B.; Ge, S., Investigation of the influence of $MoS_2$ filler on the tribological properties of carbon fiber reinforced nylon 1010 composites. *Wear* 2003, 255(1-6), 774-779.

Xie, H.; Jiang, B.; He, J.; Xia, X.; Pan, F., Lubrication performance of $MoS_2$ and $SiO_2$ nanoparticles as lubricant additives in magnesium alloy-steel contacts. *Tribology International* 2016, 93, 63-70.

What is claimed is:

1. A method of generating a lubrication interface, comprising:
    a) providing a target substrate and a growth substrate adjacent the target substrate, the target substrate and the growth substrate together defining a confinement space therebetween,
    b) allowing a quantity of water sufficient to form a confined water layer on the surface of the target substrate in the confinement space thus forming a water layer,
    c) adding a sample of a molybdenum disulfide ($MoS_2$) layer having a lateral area corresponding to the water layer, thus allowing the water in the water layer to bind with the surface of the molybdenum disulfides ($MoS_2$) layer,
    d) cooling down the target substrate to cryogenic temperature so as to freeze the water layer thus forming a molybdenum disulfide ($MoS_2$) ice layer confined between the $MoS_2$ and the target substrate,
    e) detaching the growth substrate from the molybdenum disulfide ($MoS_2$) ice layer thus leaving the molybdenum disulfide ($MoS_2$) ice layer, and
    f) subliming a surrounding area of the ice layer not covered by the molybdenum disulfide ($MoS_2$) layer, thereby thinning the ice layer to a two-dimensional ice structure having a thickness in the range of 0.5 nm to 5 nm,
    wherein the molybdenum disulfides ($MoS_2$) ice layer acts as the lubrication interface.

2. A method as claimed in claim 1, wherein in the step of applying the sample of the molybdenum disulfide ($MoS_2$), the sample is placed face up-side-down on the water layer.

3. A method as claimed in claim 1, wherein in the step of cooling down the target substrate to cryogenic temperature, the ice layer formed is confined between a van der Waals (vdW) surface of the molybdenum disulfide ($MoS_2$) layer and the surface of the target substrate.

4. A method as claimed in claim 1, wherein, the method, after the step of detaching the growth substrate, includes a step of subliming surrounding area of the ice layer not covered by the molybdenum disulfide ($MoS_2$) layer and thinning the ice layer to a two-dimensional (2D) ice layer structure.

5. A method as claimed in claim 4, wherein the molybdenum disulfides ($MoS_2$) layer is an atomic-thick layered structure.

6. A method as claimed in claim 1, wherein the area of the lubrication interface generated is defined by the area of the molybdenum disulfides ($MoS_2$) applied on the water layer.

7. A method as claimed in claim 1, wherein the area of the lubrication interface generated depends on the size of the molybdenum disulfide ($MoS_2$) applied on the water layer.

8. A method as claimed in claim 1, wherein the predetermined amount of pure water is in the range of 1 μL to 5 μL for per $cm^2$ of the target substrate and the temperature of pure water is in the range of 20° C. to 80° C.

9. A method as claimed din claim 1, wherein in the step of cooling down the target substrate, the temperature is lowered to −10° C. to −40° C.

10. A method as claimed in claim 4, wherein the step of the subliming the surrounding area of the ice layer not covered by the molybdenum disulfides ($MoS_2$) layer is conducted dry air or in vacuum.

11. A method as claimed in claim 4, wherein the step of subliming and thinning is conducted until the two-dimensional (2D) ice layer structure reaches a thickness in the range of 0.5 nm to 5 nm.

12. A method of enhancing lubrication of moving parts in conditions with a temperature between −100° C. to 0° C. and a humidity between 5% to 100%, comprising a method of generating a first lubrication interface as claimed in claim 1.

13. A method as claimed in claim 12, wherein the lubrication enhancing method is free of using an oil-based lubricant.

14. A method as claimed in claim 13, wherein the lubrication enhancing method includes using a two-dimensional solid-state lubricant different from the oil-based lubricant.

15. A lubricant made from a method of claim 1, comprising molybdenum disulfide ($MoS_2$) and water, wherein the ratio of ($MoS_2$) to water is 1/5 to 1/1 (v/v).

16. A lubricant as claimed in claim 15, wherein the lubricant consists of molybdenum disulfide ($MoS_2$) and water.

17. A method of enhancing lubrication, comprising using a molybdenum disulfide ($MoS_2$) ice layer formed by a method as claimed in claim 1 as a two-dimensional solid-state lubricant.

* * * * *